INVENTORS
HANS KLEBE
ALFRED MEFFERT
LUDWIG LANGE
GERHARD PFATZER
FRANZ-LUDWIG DAHM

BY Cushman, Darby & Cushman
ATTORNEYS

3,716,628
Patented Feb. 13, 1973

3,716,628
PROCESS FOR THE PRODUCTION OF CHLORINE
Hans Klebe, Alfred Meffert, and Ludwig Lange, Rheinfelden, Baden, Gerhard Fratzer, Ludwigshafen (Rhine), and Franz-Ludwig Dahm, Beuggen, Germany, assignors to Deutsche, Gold- und Silber-Scheideanstalt vormals Roessler, Frankfurt am Main, Germany
Filed Nov. 24, 1970, Ser. No. 92,370
Claims priority, application Germany, Dec. 20, 1969,
P 19 63 946.4
Int. Cl. C01b 7/04
U.S. Cl. 423—507
21 Claims

ABSTRACT OF THE DISCLOSURE

Chlorine is produced from hydrogen chloride containing gas by converting the hydrogen chloride to a 20 to 40 weight percent aqueous solution and reacting the solution with hydrogen peroxide to form chlorine.

---

The invention is directed to a process for the production of chlorine from hydrogen chloride or hydrogen chloride containing gases.

New processes for the production of chlorine have gathered strong momentum in recent times because of the increasing demand for chlorine in the chemical industry, especially the plastics industry.

First and foremost, the search has been for processes wherein in the chlorination of organic materials or the flame hydrolysis of silicon halides or halosilanes, the resulting hydrogen chloride can be converted again to chlorine in simple and economical manner.

It is known to convert waste hydrogen chloride with oxygen into chlorine using a potassium chloride-ferric chloride catalyst while a mixture of these geases is led through a melt of the catalyst at 450° C. In this manner about 60% of the hydrogen chloride is converted to chlorine. However, the process requires considerable expenditure of electrical energy to maintain the catalyst melt liquid. Additionally, in this process, the hydrogen chloride must be separately dried before the reaction and to the maximum extent possible, should contain no other gases. As a rule, however, the waste hydrogen chloride to be regenerated is diluted with gaseous impurities and not dry enough, so that expensive separation and drying precautions must precede the reaction.

The invention, therefore, has as a basis the problem of finding a process of merely simply recovering chlorine from moist hydrogen chloride diluted with gaseous impurities, as for example, results in the flame hydrolysis of silicon halides or halosilanes to pyrogenic silica, and without need of special apparatus expenditures.

This problem has been solved according to the invention by converting the hydrogen chloride into an aqueous solution of 20 to 40 weight percent, preferably 25–35 weight percent HCl content and reacting the mixture with hydrogen peroxide.

Surprisingly, this oxidation reaction, bound on an aqueous medium, assumes the use of the specified minimum concentration for hydrochloric acid if good yields are to be produced. At concentrations below 20% scarcely any chlorine formation takes place. Rather, there is observed besides a stagnation of the HCl consumption, a strong decomposition of the hydrogen peroxide. There can be used aqueous hydrogen peroxide solutions containing up to 90 weight percent of the hydrogen peroxide for oxidation of the dissolved hydrogen chloride. Preferably, there is used a hydrogen peroxide concentration in which, on the one hand too strong dilution in the reaction medium does not take place by solvent water introduction, and in which on the other hand no expensive preconcentration is required. These concentrations lie in the range of 40–70 weight percent $H_2O_2$. In regard to economics there has proven especially favorable a 50% hydrogen peroxide fraction obtained from the known anthraquinone process. The $H_2O_2$ concentration can be as low as 30 weight percent. The hydrogen peroxide is added in an amount of 0.8 to 0.9 mole per 2 moles of HCl.

The hydrogen chloride to be reacted can be absorbed in water until attaining the provided hydrochloric acid concentration (for example 25–35 weight percent). In a preferred form of the process of the invention, however, it is absorbed immediately in hydrochloric acid of the desired concentration.

According to another preferred form of the inventive process the hydrochloric acid used as the absorption agent for the gaseous hydrogen chloride is held at a temperature which at most, is about 20° C. above normal temperature i.e. is not over about 40° C. and generally is between 27° C. and 35° C. The selection of the optimum absorption temperature generally is adjusted according to the inert gas portion in a gas mixture containing HCl.

As inert gases often nitrogen, air, steam, carbon dioxide and mixtures thereof are present. The inert gas, can amount from 0 to nearly 100 volume percent of the entire gaseous mixture. If the portion of inert gas is high, in order to avoid escape of HCl gas from the top of the absorption column, the temperature must be controlled by scrubbing with hydrochloric acid to sufficiently reduce the partial pressure of hydrogen chloride.

A noticeable advantage of the invention over the first mentioned known process is that the reaction occurs at normal temperatures, or slightly above with sufficient speed so that no additional heat energy must be applied. The reactants, hydrogen chloride and hydrogen peroxide can be brought together depending on the carrying through of the process at the temperature provided for the absorption agent or at that temperature which occurs because of the exothermic heat of reaction of the oxidation reaction in the reaction medium. The last named temperature for the most part in practice in carrying out the process is below 60° C.

The liberation from the reaction medium of the chlorine formed in the reaction can be influenced in carrying out the reaction at reduced pressure, e.g. 0.2 to 0.95 atm. It is suitable to blow out the chlorine from the aqueous phase by means of a rinsing gas, preferably air, or by means of a combination of reduced pressure and rinsing gas to remove the chlorine.

Unreacted hydrochloric acid, after cooling to the absorption temperature, can be added again as absorption agent.

The process can be carried out batchwise or continuously. In continous operation, in order to maintain the hydrochloric acid concentration provided, the water introduced with the hydrogen peroxide, together with the water formed in the reaction can be drawn off in the form of dilute hydrochloric acid. Besides, a decline in the provided hydrochloric acid concentration can be counteracted by addition of hydrogen chloride gas.

The chlorine gas obtained from the reaction after a further suitable development is washed countercurrently by means of cold, e.g. —20 to +15° C. and preferably about 0° C. cold hydrochloric acid of the concentration provided (for example 25–35% HCl), whereby small amounts of hydrogen chloride contained in the chlorine gas in a given case are removed.

For the continuous carrying out of the process the following noted procedures have proven especially suitable:

According to a preferred industrial approach of the process the hydrogen chloride is separated from the hydrogen chloride containing gas, for example, a gaseous mixture of HCl, steam and air, first, by, in a given case a multi-step countercurrent wash with hydrochloric acid of the provided concentration and in a given case, thereupon with water, then from the eluate the heat of absorption received is withdrawn before the reaction with hydrogen peroxide, then the cooled eluate is led in concurrent flow to the hydrogen peroxide over the packed filler of a reaction tower, then the chlorine gas formed is removed in countercurrent flow and a partial stream of the diluted hydrochloride acid returning to the absorption step in discharged for the purpose of removing excess water.

This method permits the recovery of chlorine even from gaseous mixture of very low HCl content.

Another preferred continuous process consists in separating the hydrogen chloride from the hydrogen chloride containing gases by, in a given case, multi-step countercurrent wash with hydrochloric acid of the provided concentration and, in a given case, thereupon with water, boiling hydrogen chloride out of the eluate until the azeotrope is reached (about 22% hydrochloric acid), leading the desorbed hydrogen chloride countercurrent to the hydrochloric acid of the provided concentration and to the hydrogen peroxide and in the direction of flow of the chlorine formed over the packing of a reaction tower, returning a partial flow of the diluted hydrochloric acid formed back to the reaction and removing azeotrope hydrochloric acid for the purpose of discharging the excess water.

In this method there takes place inside the reaction tower, besides the oxidation of the hydrogen chloride, a subsequent concentration of the hydrochloric acid fed which counteracts the dilution effect produced by the water brought in with the hydrogen peroxide and the water of reaction.

A third possibility for a practical carrying out of the process consists in conveying the hydrogen chloride immediately into the aqueous medium without previous separation of accompanying gases and simultaneously reacting with hydrogen peroxide as a result of which there is obtained as the reaction product chlorine gas diluted with the accompanying gases.

The processes essentially depend upon leading hydrogen chloride from hydrogen chloride containing gases countercurrently to hydrochloric acid of the provided concentration and to hydrogen peroxide and in the direction of flow of the chlorine formed over the packing of a column serving as a reactor, washing the chlorine formed and the residual gas with water, for example, in a subsequently placed bubble plate column, returning the draining hydrochloric acid to the reactor after cooling to the provided absorption temperature, desorbing hydrogen chloride from a partial stream of the draining hydrochloric acid until the azeotrope is obtained in order to return it to the reaction and removing azeotrope hydrochloric acid for the purpose of discharging excess water.

This process variant especially makes possible particularly compact apparatus arrangement; it is preferably selected if gases of high HCl content are available.

The yields of chlorine gas produced in the process of the invention are surprisingly high and, based on the $H_2O_2$ in practice, mostly are above 90%.

No special apparatus is needed for carrying out the process. For absorption and reaction there can be used countercurrent washers of any design, as for example, packing loaded countercurrent columns and the like. The desorption of HCl from hydrochloric acid to obtain the azeotropically boiling solution (about 22% concentration) can take place by means of customary distillation apparatuses.

The chlorine reaction product can be subsequently treated by known measures.

The invention has the following advantages over known processes:

(a) Wet hydrogen chloride containing gases can be used.
(b) There is almost quantitative chlorine recovery based on the hydrogen peroxide added.
(c) There is no need to use catalysts.
(d) The reaction takes place without addition of heat energy.
(e) The process can be carried out in customary apparatuses.

The invention will be further explained in the following examples of preferred modes of operation in combination with the accompanying drawings.

In the drawings.

In the drawings like numerals refer to like parts.

Unless otherwise indicated all parts and percentages are by weight.

The abbreviation $Nm.^3$ indicates normal cubic meters, i.e. the volume at standard temperature and pressure (STP).

EXAMPLE 1

Figure 1:
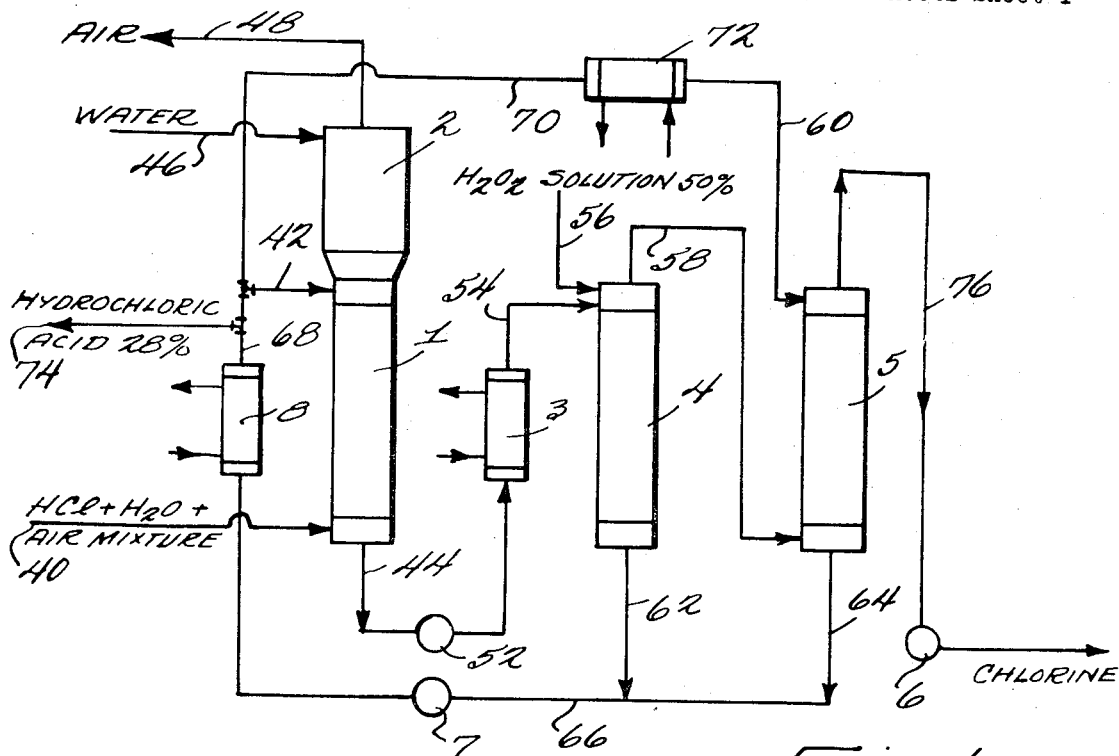
FIG. 1 is a schematic illustration of a process for the recovery of chlorine from a gas mixture of low HCl content according to Example 1.

Referring to FIG. 1, a mixture of 695 $Nm.^3$/hour of air (corresponding to 896 kg./h. of air); 196 $Nm.^3$/h. HCl (equal to 20.7 volume percent and corresponding to 320 kg./h. HCl) and 46 $Nm.^3$/h. $H_2O$ (corresponding to 37 kg./h. $H_2O$) were fed into the bottom of packed column 1 having a diameter of 500 mm. and a filled height of 2 meters (35 mm. diameter Raschig rings as filling). The column was scrubbed hourly with 10 $m.^3$ of 28% hydrochloric acid (11,400 kg./h.) entering via conduit 42 at a temperature of 30° C. The hydrochloric acid absorbed the main portion of the hydrogen chloride and left the absorption column via conduit 44 at about 45° C. and a concentration of about 30%. The removal of residual hydrogen chloride from the gaseous mixture took place in a subsequently provided bubble tray column 2 to which was admitted about 50 l./h. of water from conduit 46, whereby the draining hydrochloric acid was admixed to the hydrochloric acid of the main absorption. In the exothermically proceeding absorption 18 kg./h. of water vapor were removed, together with the air through conduit 48.

The hydrochloric acid of about 30% concentration which drained from column 1 (11,790 kg./h.) was conducted via conduit 44 and pump 52 to cooler 3 where it was cooled to about 30° C. and led, via conduit 54, to the top of reaction column 4 which had about the same measurements as column 1. There were added hourly to the top of this column 210 kg. of a 50% aqueous hydrogen peroxide solution from conduit 56. There were generated hourly 203 kg. of $Cl_2$ which was subsequently fed via conduit 58 to the bottom of column 5 and washed in that column with 28% hydrochloric acid at 0° C. introduced via conduit 60, whereby the residual hydrogen chloride was reduced to below 2 g./kg. of chlorine. This hydrochloric acid came from the combined drainings of columns 4 and 5 via conduits 62 and 64, respectively, both of which were fed into conduit 66 and cooled in cooler 72. The hydrochloric acid draining from the base of column 4 (11,793 kg./h.) having a temperature of 50° C. and a concentration of about 28 weight percent was fed via conduit 66 with the aid of pump 7 to cooler 8, cooled to 30° C. and returned to column 1 via conduits 68 and 42. A portion of the hydrochloric acid in conduit 68 was led via conduit 70 and cooler 72 to conduit 60.

By means of a compressor 6 a system pressure of a maximum of 0.4 atmosphere was maintained in columns 4 and 5. The chlorine gas removed via conduit 76 and compressor 6. To remove the excess water there were hourly withdrawn from the cycle via conduit 74 about 393 kg. of hydrochloric acid containing about 110 kg. of HCl. The yields obtained were as follows:

HCl-reaction

Hydrogen chloride brought in as hydrochloric acid: 320 kg./h.;
Theoretical chlorine yield based thereon: 312 kg./hr.
Chlorine obtained: 203 kg./h., corresponding to a yield of about 65%.

$H_2O_2$-reaction $H_2O_2$ (100%) added: 105 kg./h.
Theoretical chlorine yield based thereon: 219 kg./h.;
Chlorine yield: about 93%.

Altogether about 65% of the hydorgen chloride added was converted to chlorine while the yield based on the $H_2O_2$ added amounted to 93%.

EXAMPLE 2

Figure 2:
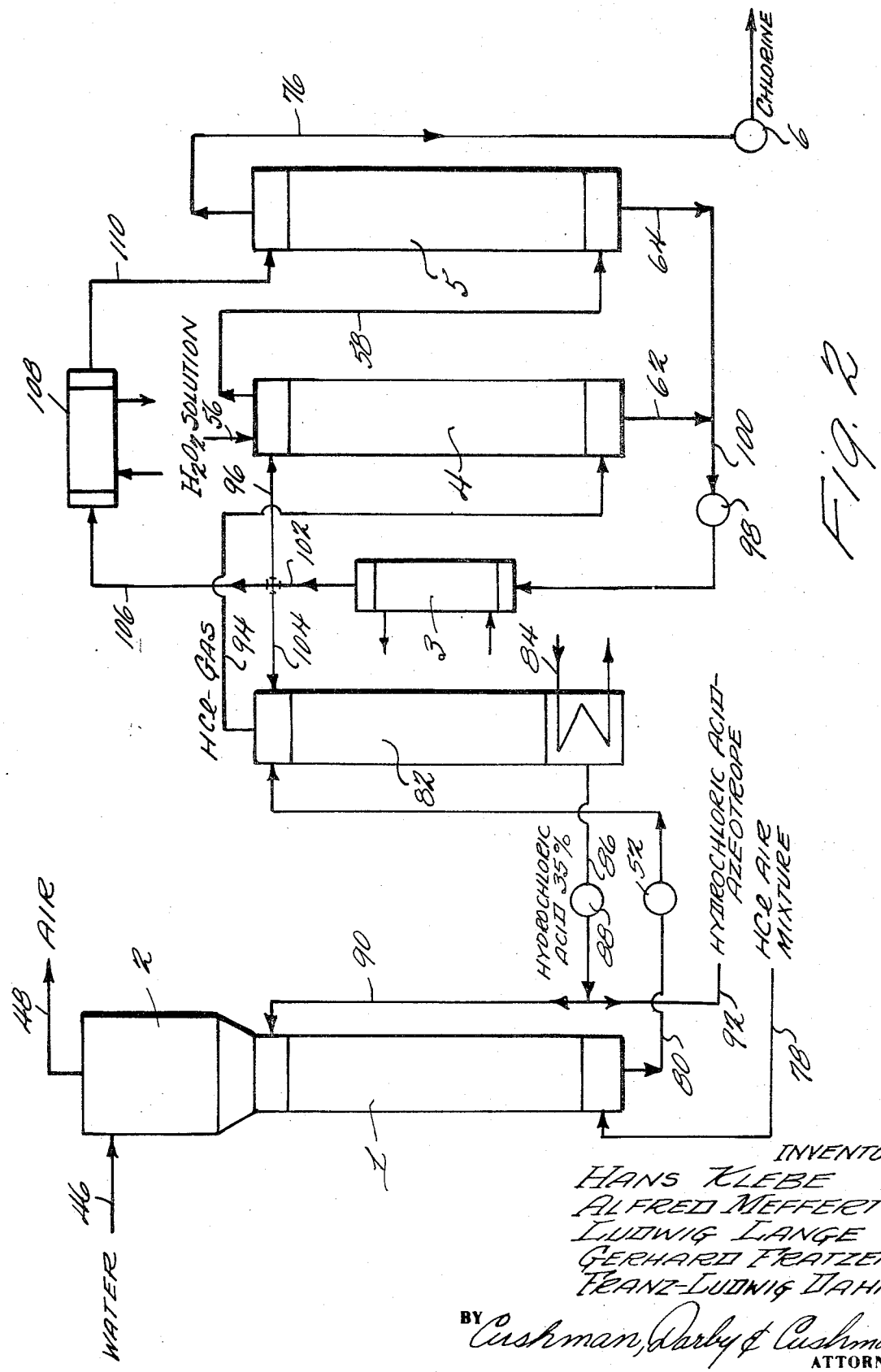

From a gaseous mixture of 1,252 Nm.³/h. of air (corresponding to 1,615 kg./h. of air) and 313 Nm.³/h. of HCl (equal to 20 volume percent and corresponding to 510 kg./h. of HCl) there was separated the hydrogen chloride as described in Example 1 through absorption in columns 1 and 2, see FIG. 2. The hydrogen chloride-air mixture was fed to the bottom of column 1 via conduit 78. The 35% hydrochloric acid (3,140 kg./h.) obtained from the bottom of column 1 was fed via conduit 80 and pump 52 to the top of desorption column 82 provided at the bottom with heating element 84 and hourly there were desorbed 510 kg. of gaseous hydrogen chloride by boiling. The hydrochloric acid was deconcentrated to a 22% azeotrope and 3,150 kg./h. of the azeotrope was distributed as follows:

2,630 kg./h. was returned from the bottom of desorption column 82 via conduit 86 and pump 88 and conduit 90 to absorption column 1. 520 kg./h. were withdrawn via conduit 92 to remove the excess water.

The isolated gaseous hydrogen chloride (51° kg./h. was conducted via conduit 94 to the bottom of a packed column 4 serving as a reactor. The column was scrubbed with 25 m.³/h. of 28% hydrochloric acid (28,500 kg./h.) entering via conduit 96 at 30° C. At the top of the column there were fed in hourly 400 kg. of 50% aqueous $H_2O_2$ solution from conduit 56. Hourly there was generated 384 kg. of chlorine which was drawn off from the head of the column via conduit 58. The hydrochloric acid (30,063 kg./h.) which had been increased by the water of reaction and the dilution water of the hydrogen peroxide drained from the bottom of reaction column 4 via conduit 62. It was pumped via pump 98 and conduit 100 to cooler 3 where it was cooled back to 30° C. before it was added via conduit 102 and 96 to the top of column. From the cycling acid there was taken off hourly about 563 kg. of 28% hydrochloric acid to remove excess water. This acid was led to the above mentioned desorber 82 via conduit 104 deconcentrated to the azeotropic concentration and 520 kg./h. of 22% hydrochloric acid, containing 115 kg./h. of hydrogen chloride removed. The desorbed hydrogen chloride (43 kg./h.) was returned to the process.

The chlorine withdrawn from the top of the column was finally (similar to Example 1) purified in washer 5 from residual hydrogen chloride and water vapor with 28% hydrochloric acid, cooled to 0° C. in cooler 108 and provided via conduits 106 and 110. The drainings of the washer 5 were recycled via conduit 64 and combined with the drainings of reactor 4 via conduit 100. The residual content after the washing column 5 was:

Lower than:
1.5 h. $H_2O$/1 kg. $Cl_2$
2.0 g. HCl/kg. $Cl_2$

The entire system was operated at a pressure of about 0.4 atmosphere which was produced by compressor 6.
The yields were calculated as follows:

HCl-reaction

Hydrogen chloride brought in as hydrochloric acid: 510 kg./h.
Theoretical chlorine yield based thereon: 497 kg./h.
Chlorine obtained: 384 kg./h., corresponding to a yield of about 77.5%.

$H_2O_2$-reaction $H_2O_2$ (100%) added: 200 kg./h.
Theoretical chlorine yield based thereon: 417 kg./h.
Chlorine yield: about 92%.

The yield of chlorine based on the hydrogen chloride added amounted to 77.5% while the yield based on the $H_2O_2$ added was about 92%.

EXAMPLE 3

Figure 3:
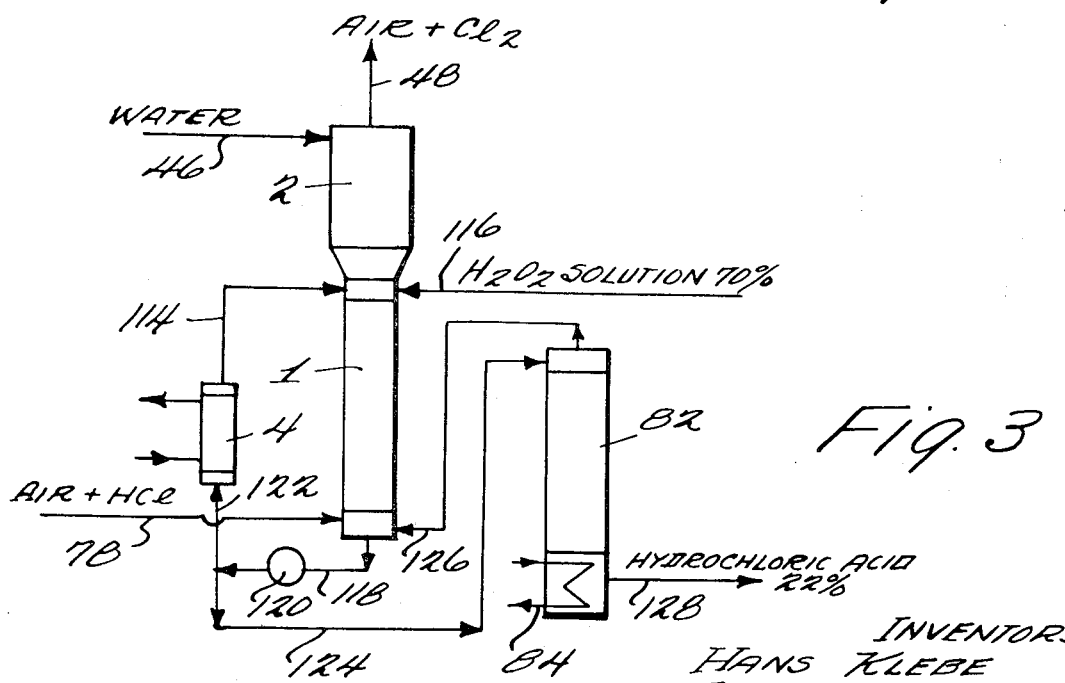
FIG. 3 is a flow diagram of an alternate process which provides for a subsequent concentration of the reacting hydrochloric acid according to Example 2; and, FIG. 3 is a schematic illustration of the process for the recovery of chlorine from gas mixtures of high HCl content according to Example 3.

As shown in FIG. 3, there were supplied hourly to the bottom of packed column 1 through conduit 78, 550 Nm.³ of air (corresponding to 710 kg./h. of air) and 572 Nm.³/h. of HCl (equal to 51 volume percent and corresponding to 932 kg./h.) The column was scrubbed with 50 m.³/h. of 32% hydrochloric acid (58,000 kg./h.), at 30° C. through conduit 114. There was also added at the top of the column 499 kg./h. of a 70% aqueous hydrogen peroxide solution through conduit 116. There were drawn off from column 1 hourly, besides the 550 Nm.³/h. of air, about 51 kg./h. of $H_2O$ and 713 kg. of $Cl_2$ with a small residual of HCl. In a subsequently provided bubble tray column 2, the residual hydrogen chloride was removed by scrubbing hourly with about 221 kg. of water introduced via conduit 46 and the hydrogen chloride supplied to the main column.

The hydrochloric acid was withdrawn from column 1 at a temperature of about 43° C. via conduit 118 pump 120 and conduit 122 and, after cooling in condenser 4 to 30° C., returned to column 1 via conduit 114.

There were withdrawn via conduit 124 hourly 998 kg. of 32% hydrochloric acid which was deconcentrated to 22% hydrochloric acid by boiling in desorber 82, whereby 128 kg./h. of hydrogen chloride was desorbed and returned via conduit 126 to the bottom of column 1 and fed back into the process. In order to withdraw excess water there was withdrawn hourly via conduit 128 about 871 kg. of 22% hydrochloric acid containing about 192 kg. of HCl.

The yields were calculated as follows:

HCl-reaction

Hydrogen chloride brought in as hydrochloric acid: 932 kg./h;
Theoretical chlorine yield based thereon: 907 kg./h.;
Chlorine obtained: 713 kg./h., corresponding to a yield of about 79%.

$H_2O_2$-reaction $H_2O_2$(100%) added: 350 kg./h.;
Theoretical chlorine yield based thereon: 730 kg./h.;
Chlorine yield about 97.5%.

Altogether about 79% of the added hydrogen chloride was converted to $Cl_2$ while the yield based on the $H_2O_2$ amounted to 97.5%.

What is claimed is:

1. A process for the production of chlorine and water from hydrogen chloride containing gases and hydrogen peroxide comprising separating the hydrogen chloride from hydrogen chloride containing gas by counter-currently washing the gases with aqueous hydrochloric acid containing 20 to 40 weight percent HCl and absorbing the hydrogen chloride gas therein, removing the heat of absorption from the eluate, then concurrently passing said eluate and hydrogen peroxide through a packed column for reaction to form chlorine, removing the chlorine from the aqueous phase by countercurrently withdrawing the chlorine formed to recover the chlorine, removing a portion of the diluted hydrochloric acid prior to returning the remainder of the hydrochloric acid to the washing step, thereby removing excess water and maintaining the concentration of the hydrochloric acid.

2. A process according to claim 1 wherein the solution contains 25–35 weight percent HCl.

3. A process according to claim 2 wherein the hydrogen peroxide is employed as an aqueous solution containing 40–70 weight percent $H_2O_2$.

4. A process according to claim 1 wherein the hydrogen peroxide is employed as an aqueous solution containing up to 90 weight percent $H_2O_2$.

5. A process according to claim 1 wherein the absorption medium has a temperature of not over about 40° C.

6. A process according to claim 5 wherein the temperature is 27–35° C.

7. A process according to claim 5 wherein the reactants are brought together at the temperature provided for the absorption medium.

8. A process according to claim 5 wherein the reactants are brought together at a temperature resulting from the exothermic reaction occurring in the reaction medium.

9. process according to claim 5 wherein the reaction is carried out at reduced pressure of 0.2–0.95.

10. A process according to claim 5 wherein the setting free of the chlorine from the aqueous phase is aided by blowing with an inert rinsing gas.

11. A process according to claim 10 wherein the rinsing gas is air.

12. A process according to claim 10 wherein the setting free of the chlorine formed from the aqueous phase is aided by maintaining a reduced pressure of 0.2–0.95.

13. A process according to claim 5 wherein the setting free of the chlorine from the aqueous phase is aided by applying together reduced pressure and rinsing gas.

14. A process according to claim 5 comprising countercurrently washing the chlorine formed with cold hydrochloric acid of the recited concentration.

15. A process according to claim 14 wherein the cold hydrochloric acid has a temperature of about 0° C.

16. A process for the production of chlorine and water from hydrogen chloride containing gases and hydrogen peroxide comprising converting the hydrogen chloride to an aqueous solution containing 20 to 40% by weight of HCl by absorbing the hydrogen chloride gas in hydrochloric acid of the recited HCl content at a temperature of not over about 40° C., reacting said solution with hydrogen peroxide to form chlorine, removing the chlorine from the aqueous phase, recovering the chlorine removed, removing unreacted hydrochloric acid from the reaction zone, cooling the removed hydrochloric acid and then returning it to the reaction zone as the absorption agent.

17. A process according to claim 16 wherein aqueous hydrogen peroxide is employed and the water brought in with the hydrogen peroxide together with the water formed in the reaction is withdrawn from the reaction zone as diluted hydrochloric acid.

18. A process according to claim 17 carried out continuously and in which a reduction in the hydrochloric acid content in the reaction zone is counteracted by adding hydrogen chloride gas.

19. A process for the production of chlorine and water from hydrogen chloride containing gases and hydrogen peroxide comprising converting the hydrogen chloride to an aqueous solution containing 20 to 40 weight percent HCl by absorbing the hydrogen chloride gas in hydrochloric acid of the recited HCl content at a temperature of not over 40° C., reacting said solution with hydrogen peroxide at a reduced pressure of 0.2 to 0.95 atmospheres to form chlorine and removing the chlorine from the aqueous phase and recovering the chlorine.

20. A process for the production of chlorine and water from hydrogen chloride containing gases and hydrogen peroxide comprising separating the hydrogen chloride from hydrogen chloride containing gases by countercurrently washing with aqueous hydrochloric acid containing 20 to 40 weight percent HCl at a temperature of not over 40° C., boiling out hydrogen chloride from the eluate to obtain a hydrogen chloride-water-azeotrope, conducting the desorbed hydrogen chloride countercurrently to hydrochloric acid of the provided concentration and hydrogen peroxide and in the direction of flow of the chlorine formed over packing in a tower returning a portion of the dilute hydrochloric acid to the reaction and discharging a portion of the dilute azeotrope hydrochloric acid to reduce the excess water present.

21. A process for the production of chlorine and water from hydrogen chloride containing gases and hydrogen chloride comprising leading the hydrogen chloride from hydrogen chloride containing gases countercurrently to aqueous hydrochloric acid containing 20 to 40 weight percent HCl at a temperature of not over 40° C. and hydrogen peroxide in the direction of flow of the chlorine formed over packing in a tower, washing the chlorine formed and residual gases with water and recovering the chlorine containing gases, drawing off the hydrochloric acid, cooling the hydrochloric acid drawn off to the provided absorption temperature, returning the cooled hydrochloric acid to the reaction zone, desorbing hydrogen chloride from a portion of the hydrochloric acid withdrawn from the reaction zone until an azeotrope is attained, returning the desorbed hydrogen chloride to the reaction zone and discharging the azeotrope hydrochloric acid to eliminate excess water.

References Cited

UNITED STATES PATENTS

| 2,545,314 | 3/1951 | Seebold | 23—154 |
| 2,909,240 | 10/1959 | Colton | 23—219 |

OTHER REFERENCES

O. Maass et al.: JACS, vol. 46, "Properties of Pure $H_2O_2$. IV. Action of the Halogens and Halogen Hydrides," 1924, pp. 290–308.

OSCAR R. VERTIZ, Primary Examiner

G. ALVARO, Assistant Examiner